Oct. 13, 1936.    F. L. CHADWICK    2,057,009
VISOR STRUCTURE
Filed July 22, 1935
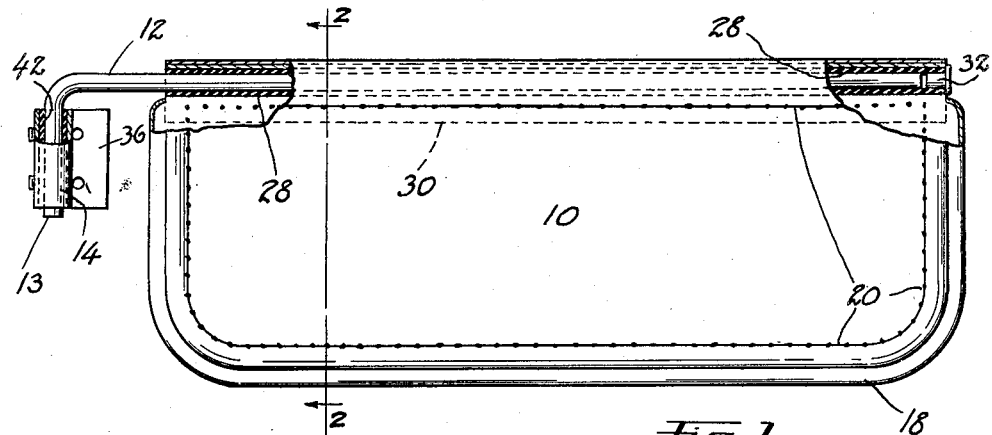
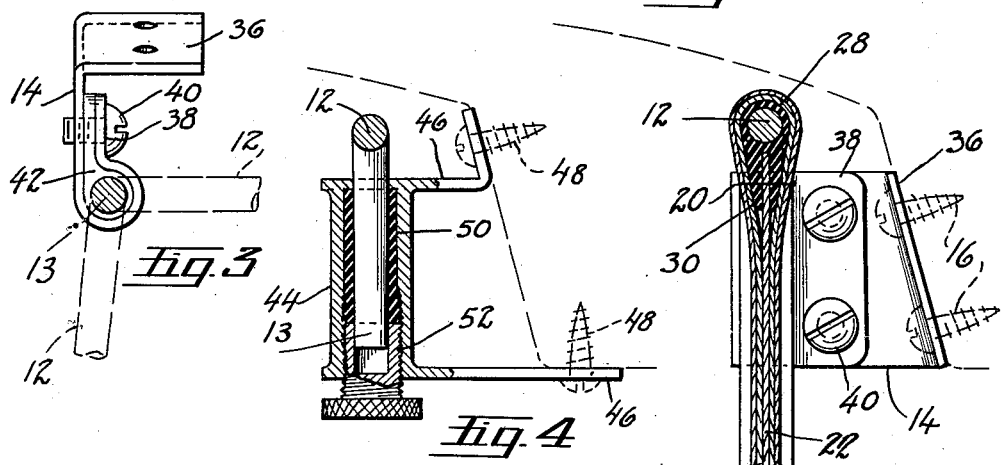
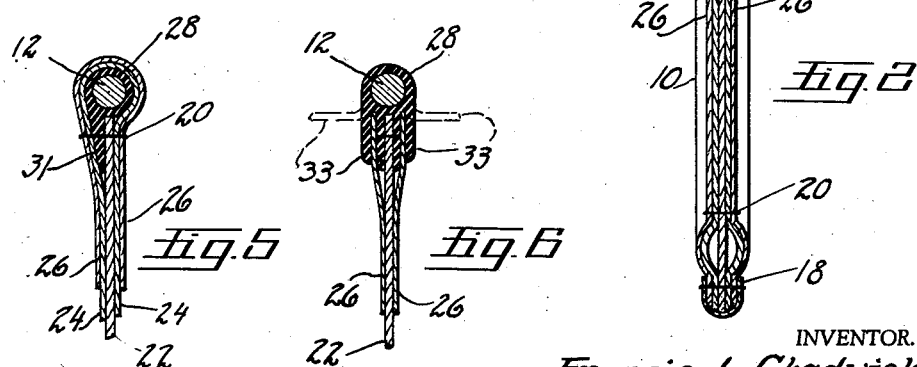
INVENTOR.
Francis L. Chadwick
BY Parker & Burton
ATTORNEYS.

Patented Oct. 13, 1936

2,057,009

UNITED STATES PATENT OFFICE 2,057,009

VISOR STRUCTURE

Francis L. Chadwick, Detroit, Mich., assignor to Woodall Industries, Incorporated, Detroit, Mich., a corporation of Michigan Application July 22, 1935, Serial No. 32,531

9 Claims. (Cl. 296—97)

My invention relates to improvements in visor construction and particularly to improvements in adjustable supporting mechanism adapted to permit the adjustment of a visor to any one of a plurality of positions and to support the same against accidental displacement at any one of said positions of adjustment.

My adjustable supporting mechanism is adapted to automatically retain the supported member in any position to which it has been adjusted. It is noiseless in its operation. It provides a cushion adapted to absorb jars or shocks which might otherwise set up undesirable vibrations. It is simple, inexpensive, and positive in its functioning. It eliminates the need for employing manually adjustable parts or elements to retain a position of adjustment.

Other objects, advantages, and meritorious features of my invention will more fully appear from the following description, appended claims, and accompanying drawing, wherein:

Figure 1 is an elevation of a visor partly broken away embodying my invention,

Fig. 2 is a vertical sectional view taken on line 2—2 of Fig. 1,

Fig. 3 is a plan of the supporting bracket shown in Fig. 1,

Fig. 4 is a sectional view through an improved type of supporting bracket, and

Figs. 5 and 6 are vertical sectional views through a fragment of a visor embodying separate modifications of my invention.

My invention is shown as embodied in a visor such as is used in the interior of automobile closed bodies to shield the eyes of an occupant from the rays of the sun. Such visors are ordinarily supported upon the header above the windshield and so mounted as to be capable of adjustment to be moved to a plurality of angular positions overlying the windshield to shield the eyes of the driver or to a position superimposing the windshield and out of the way.

It is also common practice to support such visor elements so that they may be swung to obstruct the rays of the sun entering through one of the side windows of the vehicle body. My invention is here shown as embodied in such a visor construction.

A visor assembly of this character includes the visor panel proper, the support therefor which is commonly a swinging arm or some similar device and the standard or bracket which secures the arm to the interior of the vehicle body. In the construction here shown, wherein my invention is embodied in a visor panel, the panel is indicated generally by the numeral 10, the supporting rod or arm is 12 and the bracket is 14. The bracket is shown in Figs. 2 and 4 as secured by screws 16 or the like to the header, indicated in dotted outline, which superimposes the windshield, not here shown. The utilization of such visors is so well understood that an interior view of the vehicle body is not believed to be essential.

The visor panel illustrated is made up of one or more laminations of material and in the construction shown in Fig. 1 there is a binding 18 about the margin and the several laminations of material are stitched together along the line 20. In such structure, as shown in the sectional view of Fig. 2, there may be a relatively rigid interior lamination or body 22 which may be of stiff fiber board or the like and which may define the general shape of the visor. Overlying each side of this lamination 22 is a lamination 24 which may be of a fibrous material possessing thermoplastic characteristics so that it may be molded or shaped to a desired surface configuration. A suitable example is K B board which is an asphalt impregnated fibrous product. The outer surface of the visor may be covered with upholstery cloth 26 to correspond with the upholstery trim of the interior of the body. The binding 18 may be of artificial leather or other suitable material. It is shown as stitched in place in Fig. 2 and separate lines of stitching 20 heretofore referred to are shown as provided to secure the several layers together.

A tubular mounting element 28 is provided which may be formed of rubber or other deformable resilient material. This element is shown as having a linearly extending lip 30 which is provided with a channel wherein the edge of the lamination 22 is received and held by the line of stitching as shown in Fig. 2. The interior diameter of this tubular rubber element is such that when the rod is disposed therein, the rubber element will frictionally resistingly retain any position on the rod to which it and the rod may be relatively rotated. This diameter is therefore not greater than the external diameter of the rod 12 when disposed therein. When the rod 12 is received within the tubular element as shown in Fig. 1 the visor may be rotated about the rod but it is rotated against the frictional resistance caused by the gripping engagement of the rubber tube upon the rod. As shown the rod need not extend all the way through the tubular mounting and to give a finish at the outer end a pin 32 may be inserted.

Various methods may be employed to insert the rod within the tubular mounting either by twisting it or screwing it in place or by forcing air into one end of the tubular mounting while the rod is being inserted through the opposite end or other suitable methods might be employed to facilitate the entrance of the rod. The construction is such that the frictional gripping engagement of the tube about the rod will hold the panel to any angular position of rotation to which it may be moved upon the rod. There are no metal parts to produce squeaks or noises. The tube serves as a cushion to absorb any shock or jar and prevent vibration. The assembly is cheap and as the rubber tube is completely covered its life is preserved and it will continue to function satisfactorily throughout the life of the visor.

In Fig. 5, I have shown a slightly modified form of a construction wherein the tubular member 28 is provided with a lip 31 which is not of channel form but is shaped as shown in Fig. 5 and the rigid panel element or body 22 overlies the flat face thereof and is secured by stitching thereto. This figure of the drawing also shows the employment of the overlying layers 24 and the covering material 26.

In Fig. 6 a second modified form is shown. In this the tubular mounting 28 is provided with channeled lip 33 within which the rigid panel element or body 22 is received as illustrated and stitched in place by stitching 20. In this construction flexible wings or the like 33 are provided and the covering material 26 may be inserted thereunder as shown in Fig. 6. In Fig. 6 these wings are shown in dotted outline as lifted up but they are adapted to inherently overlie the two sides of the panel as shown in the solid line view.

In the form of bracket shown in Figs. 1 and 2 the bracket includes a base plate 36 which is adapted to be secured by the screws 16 to the header and it includes a clamping portion 38 which may be held by screws 40 or the like so as to clamp about the short leg 13 of the rod 12. It is understood that any suitable means for frictionally engaging the rod to hold it to adjusted positions of rotation within the bracket may be provided but I here show an element formed of compressible deformable material such as rubber indicated at 42 which has a tubular portion through which the short leg 13 of the rod extends. This element is arranged between the two arms of the clamp 38 and pressure is exerted thereon through screws 40 so as to urge the same to snugly embrace the short leg 13 of the rod 12 so as to hold such rod at whatever angle or position of adjustment it may be moved to in positioning the visor.

In the form of bracket illustrated in Fig. 4 a somewhat different type of construction is shown. In this structure the short leg 13 of the rod 12 is received within a substantially vertical socket 44 of a bracket which has a pair of supporting legs 46 of unequal length that are secured by screws 48 or the like to the header. Within this socket 44 is a tubular element 50 formed of rubber or the like which surrounds the rod. Screwed in one end of the socket is a nut 52 which is adapted to axially compress the tubular member 50 urging it frictionally against the rod so as to adjust the gripping engagement thereof upon the rod. In this manner the rod may be so snugly engaged as to be held at any position of angular adjustment.

What I claim is:

1. In a visor assembly, a visor panel comprising two plies of panel forming material, a tubular rubber element extending lengthwise of the panel between said two plies holding them in spaced apart relationship and secured against rotation therebetween, and a supporting rod having an external diameter greater than the internal diameter of the tubular rubber element and disposed within said tubular element and grippingly engaged thereby permitting resisted rotation of the panel about the rod as an axis, said tubular element frictionally gripping said rod releasably maintaining the panel at any position to which it may be rotated about said rod as an axis.

2. In a visor assembly, a visor panel including two plies of panel forming material, a resilient tubular rubber element extending between said plies, said tubular element provided with a radially projecting linearly extending lip disposed between said plies maintaining the tubular element against rotation therebetween, a supporting rod disposed within said tubular element, said tubular element frictionally gripping said rod permitting resisted rotation of the panel about the rod and releasably maintaining the panel at adjusted positions of rotation thereabout.

3. In a visor assembly, a visor panel comprising two plies of visor forming material, a relatively rigid intermediate ply of less width arranged between said two plies, a resilient tubular rubber element extending between said two plies along one edge of said intermediate ply, said tubular element provided with a radially projecting linearly extending rib overlapping said rigid intermediate ply holding the rubber tubular element against rotation between said two plies, and a supporting rod having one end extending into said tubular element and frictionally grippingly engaged thereby permitting resisted rotation of the panel about said rod as an axis.

4. A visor panel including two plies of material, an intermediate relatively rigid ply of less width arranged therebetween, a resilient tubular rubber element extending between said two plies along the edge of said intermediate ply, said tubular element provided with a linearly extending radially projecting channeled web, the edge of said intermediate ply being disposed within the channel of said web maintaining the tubular rubber element against rotation between said two complementary plies.

5. A visor comprising a relatively rigid panel of visor forming material, a tubular rubber strip provided with an outwardly open lineraly extending radially projecting channelled web, one edge of said panel seated within the channel of said web securing the rubber strip to the panel against relative rotation and covering material folded over said rubber strip overlapping opposite sides of said panel and secured thereto.

6. The invention as defined in claim 1 characterized in that said two plies of panel forming material constitute complementary halves of a single sheet of the material folded upon itself to form said two halves and with the tubular rubber element extending lengthwise thereof within the fold.

7. A visor comprising a relatively rigid panel of visor forming material, a tubular rubber strip provided with an outwardly open linearly extending radially projecting channelled web, one edge of said panel seated within the channel of said web securing the rubber strip to the panel against relative rotation and covering material extending over each side of said panel and having its edge portion adjacent to the web of the rubber strip embedded within said web.

8. A visor including a relatively rigid panel of visor forming material, a tubular rubber element extending along one edge of said panel, said tubular rubber element being provided with an integral radially projecting linearly extending rib overlapping the adjacent marginal portion of said panel and secured thereto, and covering material folded over the rubber element and secured in position overlying opposite sides of the panel.

9. A visor including a tubular rubber strip extending along one margin of the visor, said strip being provided with a linearly extending channelled web, a relatively stiff body defining the general shape of the visor having one margin seated within the channel of said web, and a supporting rod extending into said tubular strip and frictionally grippingly engaged thereby to maintain the strip and body at any position to which they may be rotated about the rod while permitting resisted rotation thereabout.

FRANCIS L. CHADWICK.